No. 835,287. PATENTED NOV. 6, 1906.
L. D. O'ROURKE.
SLED RUNNER FOR BABY CARRIAGES.
APPLICATION FILED FEB. 8, 1906.
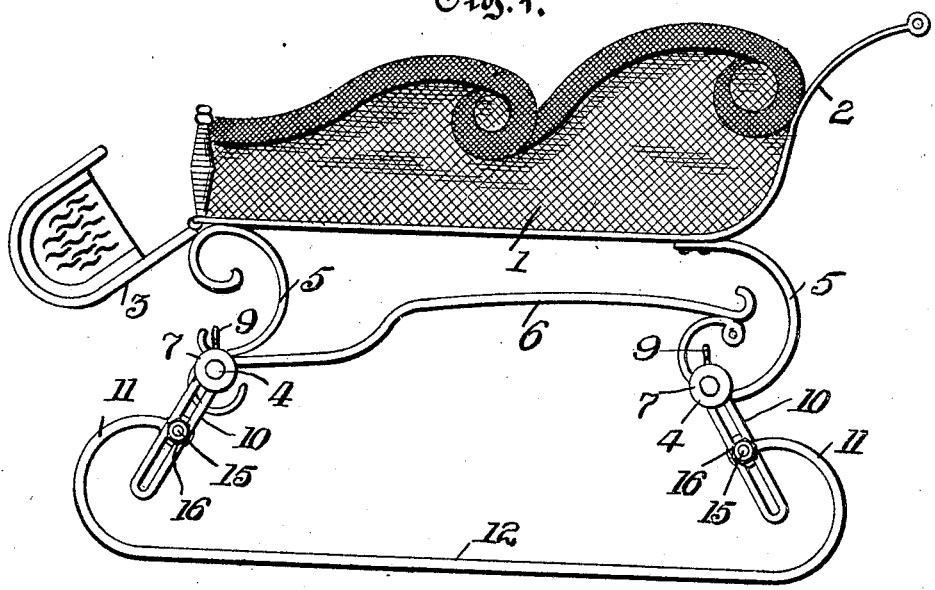
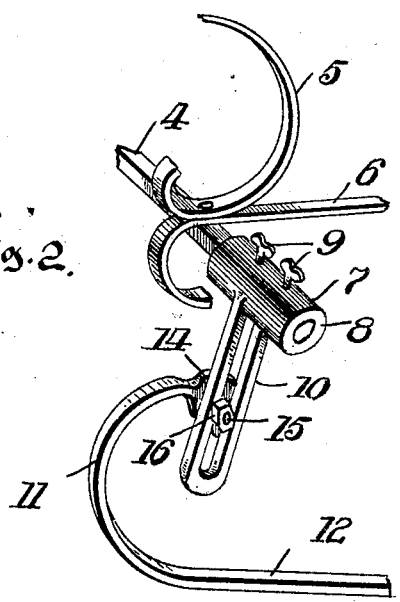
Witnesses:
Inventor.
Leo. D. O'Rourke
Attorneys.

UNITED STATES PATENT OFFICE.

LEO D. O'ROURKE, OF WOODSFIELD, OHIO.

SLED-RUNNER FOR BABY-CARRIAGES.

No. 835,287.  Specification of Letters Patent.  Patented Nov. 6, 1906.

Application filed February 8, 1906. Serial No. 300,108.

*To all whom it may concern:*

Be it known that I, LEO D. O'ROURKE, a citizen of the United States of America, residing at Woodsfield, in the county of Monroe and State of Ohio, have invented certain new and useful Improvements in Baby-Carriages, of which the following is a specification, reference being had therein to the accompanying drawings.

This invention relates to certain new and useful improvements in baby-carriages and go-carts; and the invention has for its primary object to provide a baby-carriage or go-cart with adjustable runners, whereby the baby-carriage or go-cart can be used and easily propelled upon snow-covered ground or a frozen surface, such as ice.

My invention aims to provide a baby-carriage or go-cart with simple and inexpensive runners which can be easily adjusted or entirely removed in case it is desired to restore the baby-carriage or go-cart to its original vehicle form having wheels.

Briefly described, I use an ordinary carriage or go-cart having two axles, and in lieu of the wheels generally journaled upon the ends or spindles of the axles I mount boxes carrying adjustable runners, which are adapted to maintain the body of the baby-carriage or go-cart in an elevated position, at the same time maintaining the resiliency of the same in case an irregular or roughened surface is to be passed over.

The detail construction of my invention will be hereinafter more fully described and then specifically pointed out in the claim, and, referring to the drawings accompanying this application, like numerals of reference designate corresponding parts in both views, in which—

Figure 1 is a side elevation of a baby-carriage constructed in accordance with my invention, and Fig. 2 is a fragmentary perspective view of the same.

In the accompanying drawings the reference-numeral 1 designates the body of a baby-carriage or go-cart, having handle-bars 2 and a foot-rest 3. The body 1 of the baby-carriage is supported from axles 4 4 by band-springs 5 5, the front axle 4 being braced from the rear axle by longitudinally-disposed rails 6 6.

My invention resides in providing the ends of the axles 4 4 with cylindrical boxes 7 7, having openings 8 formed therein, adapted to receive the ends of the axles 4. The boxes 7 7 are retained upon the ends of the axles by set-screws 9 9. The boxes are provided with angularly-disposed yokes 10 10, to which the curved ends 11 11 of runners 12 12 are adjustably secured. The curved ends 11 11 of the runners are enlarged, as at 14, and passing through the enlarged ends are bolts 15 15, adapted to extend through the yokes 10 10 and be retained therein by nuts 16 16.

By referring to Fig. 1 of the drawings it will be observed that the front yoke 10 extends forwardly, while the rear yoke 10 extends rearwardly to permit of the curved ends 11 of the runners 12 12 being connected thereto. By loosening the nuts 16 16 it is possible to raise and lower the body 1 of the carriage relative to the runners 12 12, and as the boxes 7 are detachably mounted upon the ends of the axles 4 4 the boxes can be removed and replaced to position the yokes 10 10 inwardly, whereby smaller runners can be used in connection with the baby-carriage or go-cart, if so desired.

I preferably construct the runners, together with the boxes and their respective yokes, of strong and durable metal, and the simple construction of my improved runners permits of the same being easily and quickly attached to an ordinary type of baby-carriage or go-cart by simply removing the wheels therefrom. Should the ends of the axles 4 4 be in the form of spindles, the set-screws 9 are adapted to engage the spindles and prevent the boxes 7 from rotating.

It is obvious that various types of baby-carriages and go-carts may be equipped with my improved runners, and such changes in the construction of the runners as to their contour may be resorted to without departing from the scope of the invention as permissible by the appended claim.

What I claim, and desire to secure by Letters Patent, is—

A means for attaching sled-runners to baby-carriages, comprising a cylindrical-shaped member, having a depended slotted arm, said cylindrical-shaped member adapted to fit upon the end of the axle of a baby-carriage adjustably mounted thereon, and the slotted arm adapted to receive a bolt carried by said sled-runners in the slot thereof, substantially as described.

In testimony whereof I affix my signature in the presence of two witnesses.

LEO D. O'ROURKE.

Witnesses:
 LYMAN J. MANN,
 ROSS HOLMES.